United States Patent [19]

Arisaka et al.

[11] 4,181,007

[45] Jan. 1, 1980

[54] METHOD AND AN APPARATUS FOR CONDUCTING MEASUREMENTS OF PHYSICAL PROPERTIES OF CIGARETTE FILTERS

[75] Inventors: Katsuharu Arisaka; Seiichi Kobayashi; Kiyoshi Higashio, all of Sakai, Japan

[73] Assignee: Daicel Ltd., Sakai, Japan

[21] Appl. No.: 940,341

[22] Filed: Sep. 7, 1978

[30] Foreign Application Priority Data

Sep. 20, 1977 [JP] Japan .................................. 52-112124

[51] Int. Cl.² ............................................. G01M 3/26
[52] U.S. Cl. ......................................... 73/37.8; 73/38
[58] Field of Search ...................... 73/37.5, 37.8, 37.9, 73/38, 41, 45.1

[56] References Cited

U.S. PATENT DOCUMENTS

| T938,010 | 9/1975 | Wrye .................................. 73/38 X |
| 3,386,281 | 6/1968 | Menge et al. ...................... 73/41 |
| 3,757,564 | 9/1973 | Blackburn et al. ................. 73/45.1 |
| 3,955,406 | 5/1976 | Strydom .............................. 73/37.5 X |
| 4,103,535 | 8/1978 | Mutter et al. ....................... 73/37.5 |

FOREIGN PATENT DOCUMENTS

929337  6/1963  United Kingdom ........................ 73/38

*Primary Examiner*—Gerald Goldberg
*Assistant Examiner*—Joseph W. Roskos
*Attorney, Agent, or Firm*—J. Harold Nissen

[57] ABSTRACT

Disclosed is a method and an apparatus for conducting measurements on at least two physical properties, such as resistance to air permeation, diameter, weight, hardness and length, of cigarette filters. At least two measuring devices are used for conducting the measurement of designated properties, respectively. The method includes the steps of (a) feeding one filter plug simultaneously to each of the measuring devices, (b) simultaneously measuring the designated physical properties of the filter plugs by the measuring devices, respectively, (c) simultaneously removing the filter plugs from the respective measuring devices after measurement, (d) simultaneously feeding the removed filter plugs, except for the one removed from the last measuring device, to the subsequent measuring devices, while feeding a fresh filter plug to the first measuring device, (e) repeating the above-mentioned procedures, and (f) scanning the results of the measurements by the respective measuring devices in succession to store such result in a memory device.

6 Claims, 5 Drawing Figures

METHOD AND AN APPARATUS FOR CONDUCTING MEASUREMENTS OF PHYSICAL PROPERTIES OF CIGARETTE FILTERS

BACKGROUND OF THE INVENTION

The present invention relates generally to a measuring method and an apparatus for carrying out such a method and, more particularly, to a method and an apparatus for automatically measuring physical properties, such as resistance to air permeation, diameter, weight, hardness and length, of cigarette filters.

Most cigarette filters are now prepared from acetate fibers. Namely, most cigarette filters are prepared by applying plasticizer uniformly to bundles of acetate fiber filaments, wrapping the bundles in a cylindrical form by using a winding paper and cutting the cylinder to a predetermined length of 90 mm, 102 mm or 120 mm and the like. The cylindrical product prepared in such a way is called a "filter plug". This filter plug is cut into a certain length and connected to a cigarette to form a filter-tipped cigarette.

The quantity of such filter plugs which must be produced at one time is very large. Accordingly, physical properties of such a large quantity of filter plugs must be efficiently measured for maintaining and inspecting the quality thereof during particular times of manufacturing, delivering and receiving the products. It is also required that large quantities of filter plugs be promptly measured, and that the precise data of the measurement be accurately recorded.

Physical properties of filter plugs which can be measured are, for instance, their (a) resistance to air permeation, (b) diameter, (c) weight, (d) hardness and (e) length. Resistance to air permeation affects the degree of ease in the smoking of a cigarette to which a filter plug is attached, and this resistance property has a direct relationship to the smoke filtration efficiency. Hardness is a property which is important from the view point of handling a filter plug. A certain degree of hardness is necessary when a filter plug is cut or attached to a cigarette.

Each of these physical properties is measured and determined exclusively by a special measuring device. According to the conventional techniques, such operations as supplying filter plugs to the respective measuring device and recording and storing the measurement data are manually conducted.

SUMMARY OF THE INVENTION

It is, therefore, a primary object of the present invention to provide a method and an apparatus for measuring and determining physical properties of cigarette filters in the form of the so-called filter plugs, in which the supply of filter plugs to the respective measuring devices can be automatically and precisely performed.

In accordance with one aspect of the present invention, there is provided a method for conducting measurements on at least two physical properties of cigarette filters, their air permeation resistance, diameter, weight, hardness and length, by using at least two measuring devices for conducting measurements of the designated properties, respectively, such method comprising the steps of:

(a) feeding one filter plug simultaneously to each of the measuring devices;

(b) simultaneously measuring said designated physical properties of the filter plugs by the measuring devices, respectively;

(c) simultaneously removing the filter plugs from the respective measuring devices after measurement;

(d) simultaneously feeding the removed filter plugs, except for the one removed from the last measuring device, to the subsequent measuring devices, while feeding a fresh filter plug to the first measuring device;

(e) repeating the above-mentioned procedures, and (f) scanning the results of the measurements by the respective measuring devices in succession to store such results in a memory device.

In accordance with another aspect of the present invention, there is provided an apparatus for conducting measurements on at least two physical properties of cigarette filters, such as their air permeation resistance, diameter, weight, hardness and length, which apparatus comprising:

(a) at least two measuring devices arranged in parallel and equidistantly to conduct measurements of designated properties, respectively;

(b) the same number of plug holders as that of the measuring devices, the plug holders being equidistantly arranged in parallel at positions confronting the corresponding measuring devices and the distances between the respective plug holders and the corresponding measuring devices being made equal to one another, so that the plug holders can move integrally not only in the front-rear direction approaching or leaving the corresponding measuring devices but also in the left-right direction along a distance corresponding to the distance between every two adjacent measuring devices, whereby it is made possible to simultaneously deliver the measured filter plugs to the respective plug holders from the corresponding measuring devices and also to simultaneously deliver the received filter plugs to the subsequent measuring devices;

(c) plug feed means disposed to supply fresh filter plugs one by one to the first plug holder;

(d) a mechanism for receiving from the final measuring device the filter plugs for which the measurements of the designated properties have been completed and for keeping the filter plugs therein, and (e) a memory device capable of storing therein results of the measurements by the respective measuring devices by scanning the results in succession.

when the above-mentioned measurement method and the apparatus of the present invention are used, physical properties of large quantities of filter plugs can be measured promptly and precisely, in order to insure that delivery of filter plugs to respective measuring devices and receipt of the measured filter plugs from the measuring devices can be accomplished automatically. As a result, a labor-saving effect can be attained and inaccurate deviations in measurements caused by operators can be eliminated.

DETAILED EXPLANATION OF THE PREFERRED EMBODIMENTS

Figure 1:
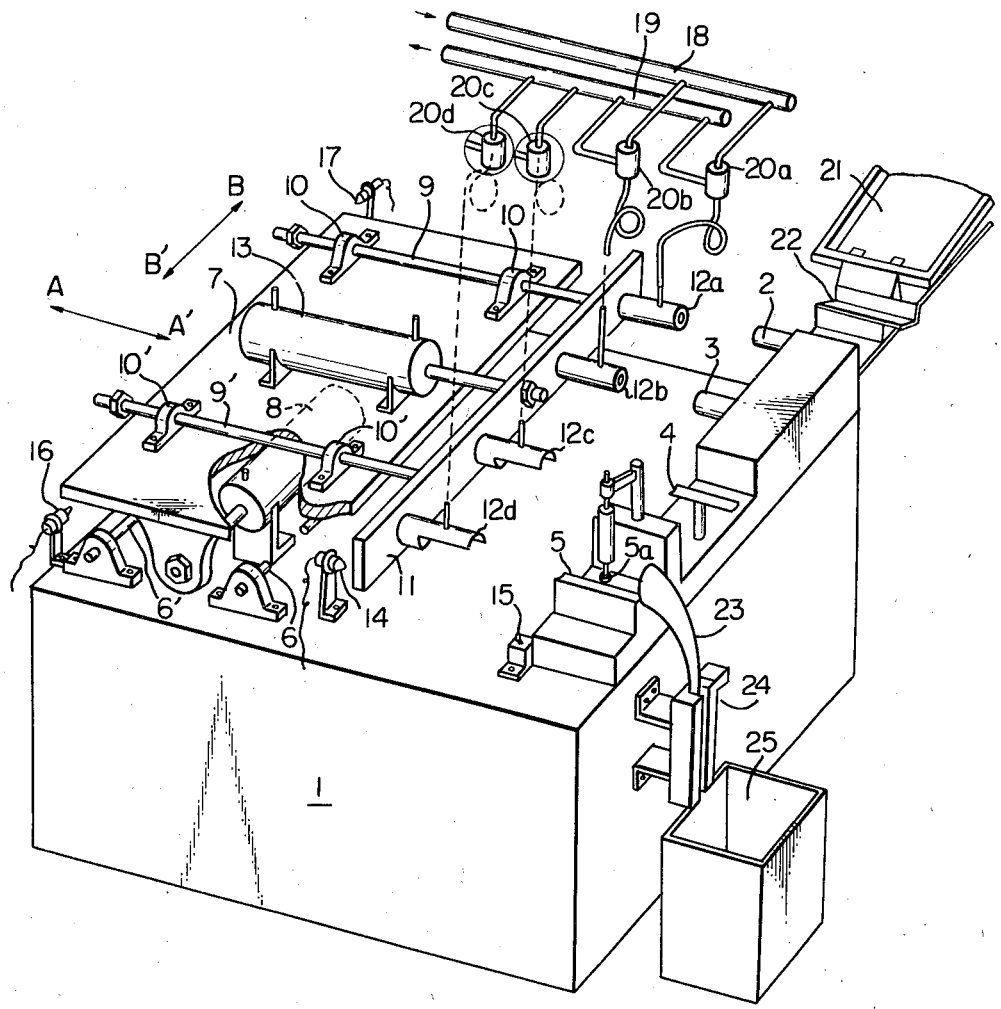
FIG. 1 is a perspective view showing a part of an embodiment of the measuring apparatus according to the present invention.

Referring now to FIG. 1, measuring devices 2, 3, 4 and 5 are arranged equidistantly and in parallel on one end of the top face of a fixed base 1. A known measuring device 2 is used for determining the resistance to air permeation of a filter plug (not shown). This measuring device 2 sucks air from one end of the filter plug at a rate of, for example, 17.5 ml/sec., and the suction pressure is expressed in terms of the height of a water column. A known pneumatic measuring device 3, such as air-micrometer, is used for measuring the diameter of the filter plug. A known electronic weighing device 4 is for measuring the weight of the filter plug. A measuring device 5 is used for measuring the hardness of the filter plug. For example, as the measuring device 5, a known hardness measuring device in which a filter plug is horizontally located is used, wherein a load of 300 g is forced upon for 10 seconds from above on the filter plug through a disc 5a having a diameter of 12 mm and the degree of flexion of the plug is expressed as 0.1 mm.

Two parallel guide rails 6 and 6' are placed on the fixed base 1 so that a stand 7 can slide along the guide rails 6 and 6' by means of a hydraulic cylinder 8. Furthermore, two parallel guide rails 9 and 9', which can slide through bearings 10 and 10', are arranged on the stand 7. A stand 11 is fixed to the free ends of the guide rails 9 and 9'. This stand 11 is arranged so that it can slide with respect to the stand 7 by means of a hydraulic cylinder 13. Plug holders 12a, 12b, 12c and 12d for delivering filter plugs to the corresponding measuring devices 2, 3, 4 and 5 and for receiving the measured filter plugs therefrom are attached to the stand 11. The total number of plug holders is the same as the total number of measuring devices. The plug holders are arranged equidistantly in parallel at positions confronting the corresponding measuring devices. The distances between the respective plug holders and the corresponding measuring devices are made equal to one another. The stand 7 can be slid by means of the hydraulic cylinder 8, and the stand 11 can be slid with respect to the stand 7 by means of the hydraulic cylinder 13. Therefore, the plug holders 12a, 12b, 12c and 12d can be integrally moved not only in the front-rear direction approaching or leaving the measuring devices (by "front-rear direction" is meant the direction indicated by the line A-A') but also in the left-right direction (by "left-right direction" is meant the direction indicated by the line B-B') along a distance corresponding to the distance between every two adjacent measuring devices. The movement in the front-rear direction is controlled by limit switches 14 and 15, and the movement in the left-right direction is controlled by limit switches 16 and 17.

A pipe 18 for feeding compressed air and a pipe 19 for feeding air of a negative pressure are provided, and the plug holders 12a and 12b are connected to both the pipes 18 and 19 through three way cocks 20a and 20b, and the plug holders 12c and 12d are connected to the pipe 19 for feeding air of a reduced pressure through three way cocks 20c and 20d.

Figure 2:
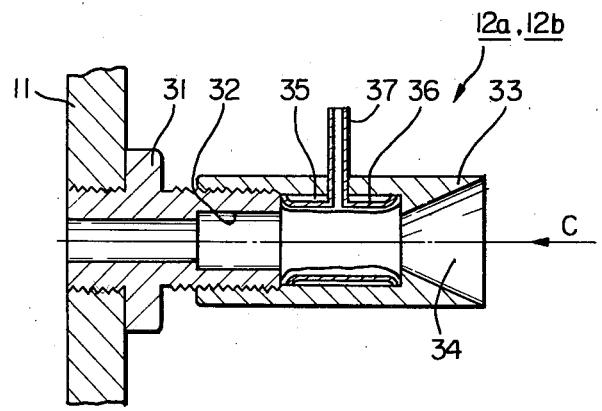
FIG. 2 is a cross-sectional view showing one instance of the plug holder which is used in the embodiment shown in FIG. 1.

The structure of the plug holder will now be described with reference to FIGS. 2 through 4. FIG. 2 is a view illustrating the sections of the plug holders 12a and 12b corresponding to the measuring devices 2 and 3. A flange member 31 is provided for attaching the plug holders 12a and 12b to the stand 11, and an inner cylindrical portion 32 having a diameter slightly larger than the diameter of each of the filter plug pierces through the flange member 31 along the central axis thereof. Reference numeral 33 designates a body of the plug holder, and a hole 34 having a diameter slightly larger than the diameter of the filter plug is formed in the body 33 of the holder along the central axis thereof, so that the plug holder can be screwed to the flange member 31. The right end (shown in FIG. 2) of the hole 34 is inclined and outwardly expanded like a trumpet so as to facilitate receipt of the filter plug which is inserted in the direction of the arrow C. An insert cylinder pipe 35 (having an inner diameter of 10 mm and a length of 20 mm) having an inner diameter slightly larger than the diameter of the filter plug is inserted into the enlarged portion of the hole 34 of the body 33 of the plug holder. A thin rubber tube 36 is attached to the inside of the insert cylinder pipe 35. Both ends of the rubber tube 36 are bent over both ends of the insert cylinder pipe 35, respectively so that an air-tight seal is formed therebetween. A fine pipe 37 is attached to the center of the insert cylinder pipe 35 so as to pierce through the body 33 of the plug holder and is then connected to both the compressed air pipe 18 and the negative pressure air pipe 19 through the three way cocks 20a and 20b (see FIG. 1). When compressed air (for example, a water column height of about 350 mm) is supplied to the fine pipe 37, the compressed air flows into the space between the insert cylinder pipe 35 and the rubber tube 36 to inflate the rubber tube 36 and to gently hold the filter plug in the rubber tube 36. When the filter plug is discharged, the portion of the filter plug bulging out of the plug holder body 33 is inserted into a sample receiving end member (not shown) of the measuring device 2 or 3 having the same structure as that of the plug holders 12a and 12b, and negative pressure air (for example, a water column height of about −350 mm) is applied to the fine pipe 37 and the pressure is so changed that compressed air (for example, a water column height of about 350 mm) is supplied to the sample receiving end member, whereby the filter plug is delivered from the plug holder 12a or 12b to the measuring device 2 or 3. When the filter plugs are received from the measuring devices 2 and 3 by the plug holders 12a and 12b, the above procedures are repeated in a reverse manner.

Figure 3:
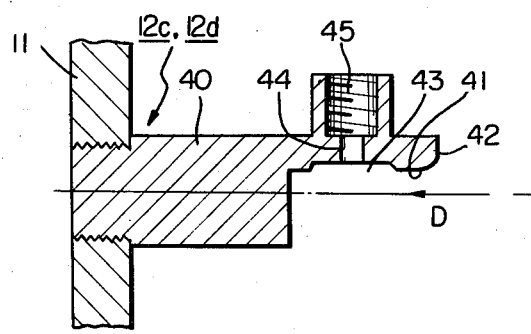
FIG. 3 is a cross-sectional view showing another instance of the plug holder which is used in the embodiment shown in FIG. 1.
Figure 4:
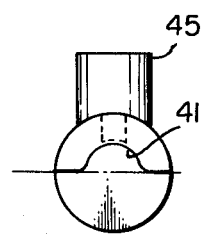
FIG. 4 is a view seen along the direction of the arrow D shown in FIG. 3.

FIG. 3 is a view showing a section of the plug holders 12c and 12d which corresponds to the measuring devices 4 and 5. FIG. 4 is a right side view of the plug holders 12c and 12d, namely, a view seen along the filter plug-inserting direction (arrow D in FIG. 3). A body 40 of the plug holder is formed by forming a hole 41 having a diameter substantially equal to or slightly larger than the diameter of the filter plug on a round rod from one side face 42 along the central axis thereof in a predetermined depth (about 25 mm), cutting off the lower half of the resulting tubular member along the axial direction and forming a dent 43 (having, for example, a length of about 15 mm, a width of about 3 mm and a depth of about 1.5 mm) on a part of the cylindrical inner face of the remaining upper half of the hole 41. A small hole 44 is formed on the body 40 of the plug holder and is opened to the dent 43 so that air is introduced into the dent 43 from the outside and discharged therefrom. A pipe connecting joint 45 is connected to this small hole 44. This pipe connecting joint 45 is connected to the reduced pressure air pipe 19 through the three way cocks 20c and 20d (see FIG. 1). When the three way cocks 20c and 20d are opened, air present in the hole 41 and dent 43 is sucked through the small hole 44 and the pipe connecting joint 45. Accordingly, when the filter plug is brought close to the hole 41, the filter plug adheres closely to the cylindrical inner face of the hole 41, and the plug is then sucked and held in this state by reduced pressure air present in the dent 43. When the three way cocks 20c and 20d are closed, atmospheric pressure is restored in the dent 43 and the filter plug is allowed to fall down due its own gravity. When such plug holders 12c and 12d are employed, it is possible to gently place a filter plug, for example, on a scale of the measuring device 4 (electronic weighing device) or on a measuring zone of the measuring device 5 (hardness measuring device).

The operations of the measuring apparatus of the present invention will now be described.

Referring to FIG. 1, filter plugs stored in a plug hopper 21 are fed one by one to a plug depository 22 for storing fresh filter plugs to be measured.

When measurements of the physical properties of filter plugs, such as permeation resistance, diameter, weight and hardness, are completed by the measuring devices 2, 3, 4 and 5, respectively, the stand 7 is moved to the right (in the direction of the arrow B) by means of the hydraulic cylinder 8 and the stand 7 is stopped when it hits against the limit switch 17. At this point, the plug holders 12a, 12b, 12c and 12d are delivered to such positions that they are located in straight lines along axial directions of the plug depository 22 and the measuring devices 2, 3 and 4, respectively. Then, the stand 11 is moved forwardly (in the direction of the arrow A') by means of the hydraulic cylinder 13, and the stand is stopped when it hits against the limit switch 15. At this point, compressed air is supplied to the plug holders 12a and 12b and negative pressure air is supplied to the plug holders 12c and 12d, and in the same manner as described above, the plug holders 12a, 12b, 12c and 12d simultaneously hold a fresh filter plug in the plug depository 22 and filter plugs in the measuring devices 2, 3 and 4, respectively. While the plug holders 12a, 12b, 12c and 12d are in the state of holding filter plugs, the stands 11 is moved backwardly (in the direction of the arrow A) by means of the hydraulic cylinder 13, and when the stand 11 hits against the limit switch 14, the stand 11 is stopped. Subsequently, the stand 7 is moved to the left (in the direction of the arrow B') by means of the hydraulic cylinder 8, and when the stand 7 hits against the limit switch 16, the stand 7 is stopped. At this point, the plug holders 12a, 12b, 12c and 12d are delivered to such positions that they are located in straight lines along the axial directions of the measuring devices 2, 3, 4 and 5, respectively. Then, the stand 11 is moved forwardly (in the direction of the arrow A') by the hydraulic cylinder 13, and the stand is stopped again when it hits against the limit switch 15. At this point, the change-over of the pressure is conducted, so that negative air pressure is supplied to the plug holders 12a and 12b and supply of negative air pressure to the plug holders 12c and 12d is stopped. Accordingly, in the same manner as described hereinbefore, the plug holders 12a, 12b, 12c and 12d simultaneously supply filter plugs to the measuring devices 2, 3, 4 and 5, respectively. At this point, the filter plug which was in the final measuring device 5 is pushed out by the plug held by the plug holder 12d and is then fed to a length measuring device 24 through a guide member 23. After the length of the plug has been measured by the measuring device 24, the plug is introduced and kept in a case 25. Then, the stand 11 is moved backwardly (in the direction of the arrow A) by means of the hydraulic cylinder 13, and the stand is stopped when it hits against the limit switch 14. This stand 11 is kept at this stoppage position until measurement is completed by each measuring device. In the measuring devices 2, 3, 4 and 5, after a lapse of time (of about 2 seconds) necessary for stabilizing temporary disorders in the supplied filter plugs (for example, vibrations of the filter plugs at the time of receipt thereof), measurements of the respective above-mentioned properties are simultaneously started. After measurement by each measuring device is completed, the above operations are repeated again.

Figure 5:
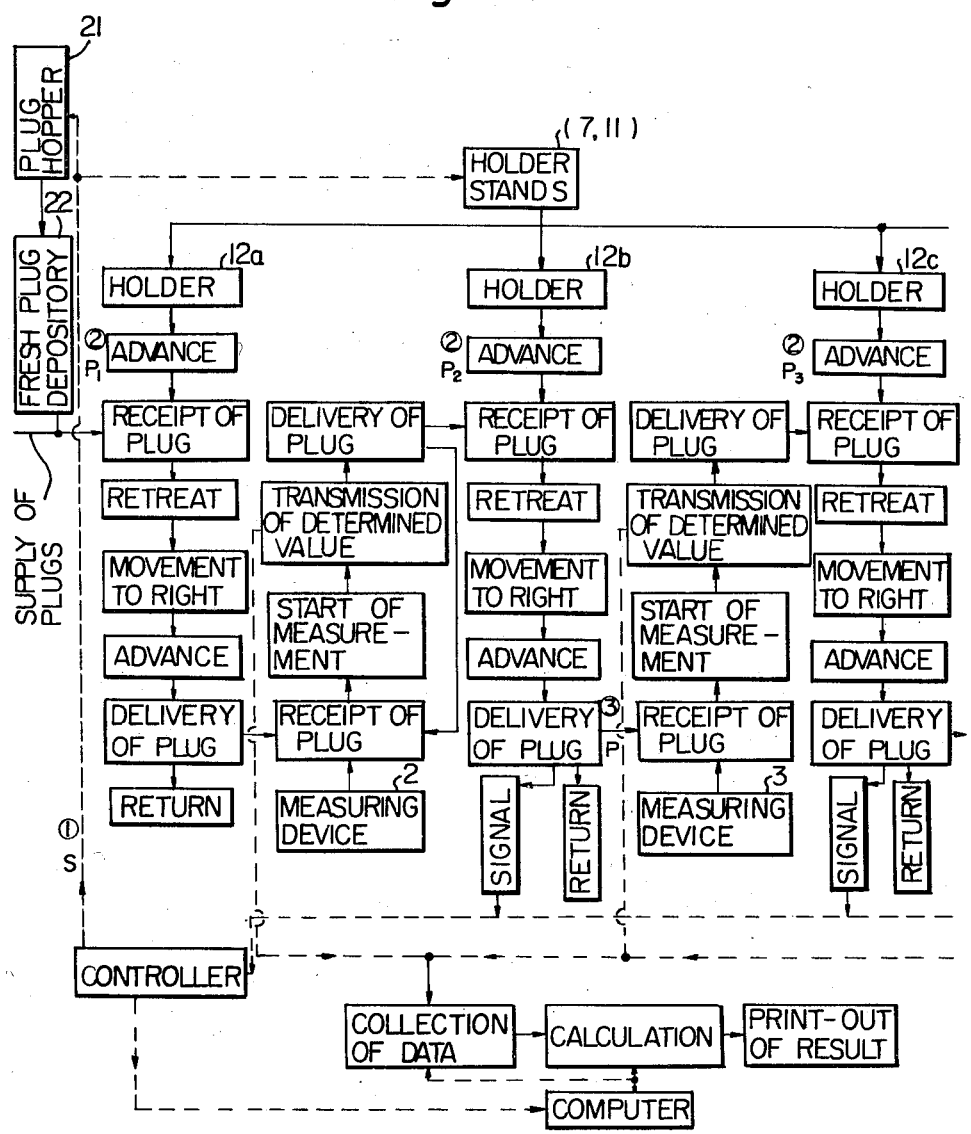
FIG. 5 is a block diagram illustrating the operations of the measuring apparatus of the present invention.

FIG. 5 is a block diagram showing the above-mentioned operations of the measuring apparatus of the present invention. These operations are performed completely automatically. In the first stage (1), after completion of the measurement by each measuring device, a signal S is emitted from a controller of an electronic computer, and by this signal, fresh filter plugs are supplied to the plug depository 22 from the plug hopper 21 and the hydraulic cylinders 8 and 13 are actuated to deliver the plug holders 12a, 12b, 12c and 12d to the respective filter plug-receiving positions. In the second stage (2), the respective plug holders receive filter plugs $P_1, P_2, \ldots$, and in the third stage (3), the filter plugs are transferred to the measuring devices 2, 3, . . . Actuation of the hydraulic cylinders 8 and 13 and change-over of the three ways cocks 20a, 20b, 20c and 20d are controlled by signals emitted from the limit switches 14, 15, 16 and 17. As shown in FIG. 5, the respective filter plugs $P_1$, $P_2$ and $P_3$ are subjected to measurement by the measuring devices 2, 3, 4 and 5 in succession, and after the length thereof is finally measured by the length measuring device 24 (see FIG. 1), the plugs are introduced and kept in the case 25.

Electric signals as the results of the measurements of cigarette filter plugs by the measuring devices 2, 3, 4 and 5 and the length measuring device 24 are converted into digital signals, and are inputted into a memory device of the electronic computer. In order to realize this operation, a converter (not shown) for converting pressure into an electric signal is attached to the devices 2 and 3 for measuring the air permeation resistance, an electronic weighing device is used as the device 4 for measuring the weight, and electronic measuring devices are used as the devices 5 and 24 for measuring the hardness and length, respectively of the filter plugs.

Since results of the respective measurements of properties obtained with respect to each filter plug are inputted into the electronic computer in succession, in order to obtain data of the respective measurements of properties with respect to every filter plug, it is necessary to scan data in succession and to input such data into the memory device. When data corresponding to a predetermined input frequency (for example, the frequency corresponding to 50 filter plugs) are inputted into the memory device of the electronic computer, transmission of data-collecting signals is stopped and data are read out from the memory device in connection with the respective measurements of properties performed in succession. Such data are summed up and calculations necessary for obtaining average values, standard deviations, maximum values, minimum values and the like are conducted, and these values are printed according to the predetermined form.

What we claim is:

1. A method of conducting measurements on at least two physical properties of cigarette filters, such as resistance to air permeation, diameter, weight, hardness and length thereof, by using at least two measuring devices for conducting the measurement of designated properties, respectively, said method comprising the steps of:
    (a) feeding one filter plug simultaneously to each of said measuring devices;
    (b) simultaneously measuring said designated physical properties of said filter plugs by said measuring devices, respectively;
    (c) simultaneously removing said filter plugs from said respective measuring devices after measurement;
    (d) simultaneously feeding the removed filter plugs, except for one removed from the last measuring device, to the subsequent measuring devices, while feeding a fresh filter plug to the first measuring device;
    (e) repeating said procedures, and;
    (f) scanning the results of said measurements by said respective measuring devices in succession to store said results in a memory device.

2. A method of conducting measurements as set forth in claim 1, wherein said filter plugs are removed from and fed to said measuring devices by means of plug holders, each of said holder comprises a pipe having an inner diameter slightly larger than the diameter of the filter plug to be measured and a rubber tube having both ends thereof air-tightly sealed, said rubber tube being attached to the inside of said pipe so that air can be taken in and out between said rubber tube and said pipe.

3. A method of conducting measurements as set forth in claim 1, wherein each of said plug holders comprises a member having a semicylindrical face on the upper side thereof, said semicylindrical face having an inner diameter substantially equal to or slightly larger than the diameter of said filter plug to be measured, a dent formed on said semicylindrical face and a small air take-out and take-in hole opened to said dent.

4. An apparatus for conducting measurements on at least two physical properties of cigarette filters, such as resistance to air permeation, diameter, weight, hardness and length thereof, said apparatus comprising:
    (a) at least two measuring devices arranged in parallel and equidistantly to conduct measurements of the designated properties, respectively;
    (b) the same number of plug holders as that of the measuring devices, said plug holders being equidistantly arranged in parallel at positions confronting said corresponding measuring devices and distances between said respective plug holders and said corresponding measuring devices being made equal to one another, so that said plug holders can move integrally not only in the front-rear direction approaching or leaving said corresponding measuring devices but also in the left-right direction along a distance corresponding to the distance between every two adjacent measuring devices, whereby it is made possible to simultaneously deliver measured filter plugs to said respective plug holders from said corresponding measuring devices and also to simultaneously deliver received filter plugs to subsequent measuring devices;
    (c) plug feeding means disposed to supply fresh filter plugs one by one to the first plug holder;
    (d) means for receiving from the final measuring device said filter plugs for which the measurements of said designated properties have been completed and for keeping said filter plugs therein, and;
    (e) a memory device capable of storing therein results of the measurements by said respective measuring devices by scanning said results in succession.

5. An apparatus for conducting measurements as set forth in claim 4, wherein at least one of said plug holders comprises a pipe having an inner diameter slightly larger than the diameter of the filter plug to be measured and a rubber tube having both ends thereof air-tightly sealed, said rubber tube being attached to the inside of said pipe so that air can be taken in and out between said rubber tube and said pipe.

6. An apparatus for conducting measurements as set forth in claim 4, wherein at least one of said plug holders comprises a member having a semicylindrical face on the upper side thereof, said semicylindrical face having an inner diameter substantially equal to or slightly larger than the diameter of said filter plug to be measured, a dent formed on said semicylindrical face and a small air take-out and take-in hole opened to said dent.

* * * * *